Feb. 3, 1925. 1,525,363
C. M. BOYCE
CONVEYER
Filed June 19, 1920 14 Sheets-Sheet 3
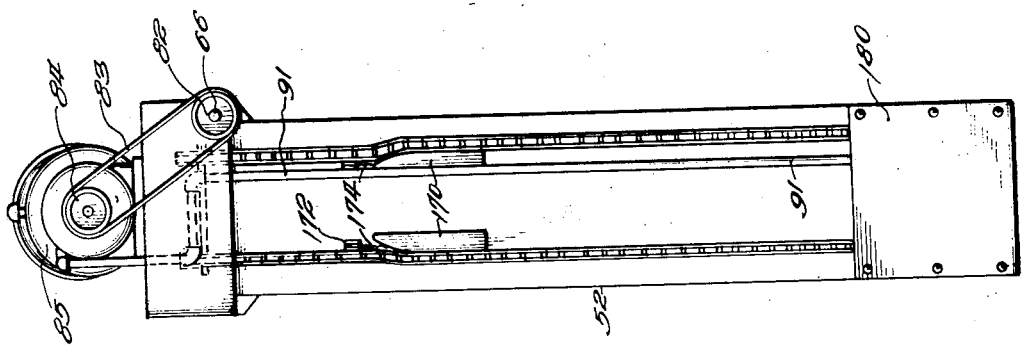
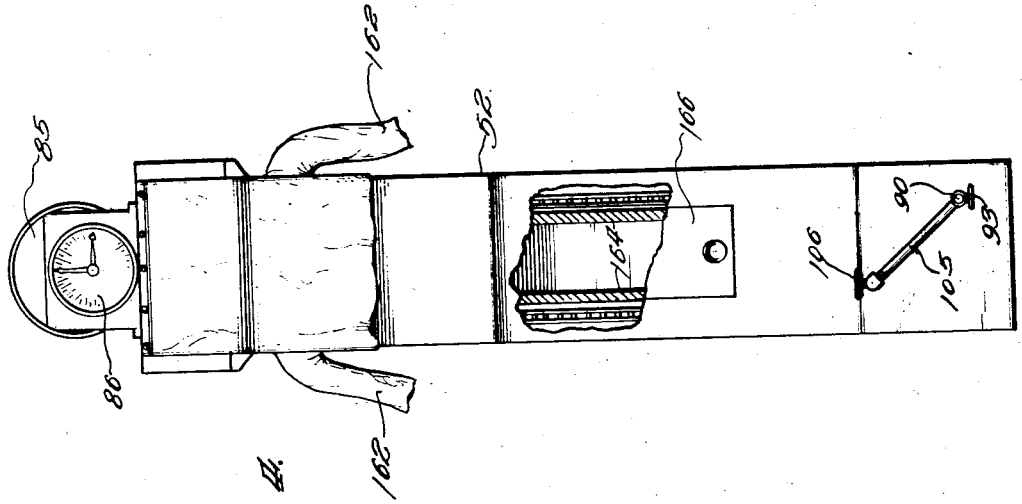
Inventor.
Charles M. Boyce.

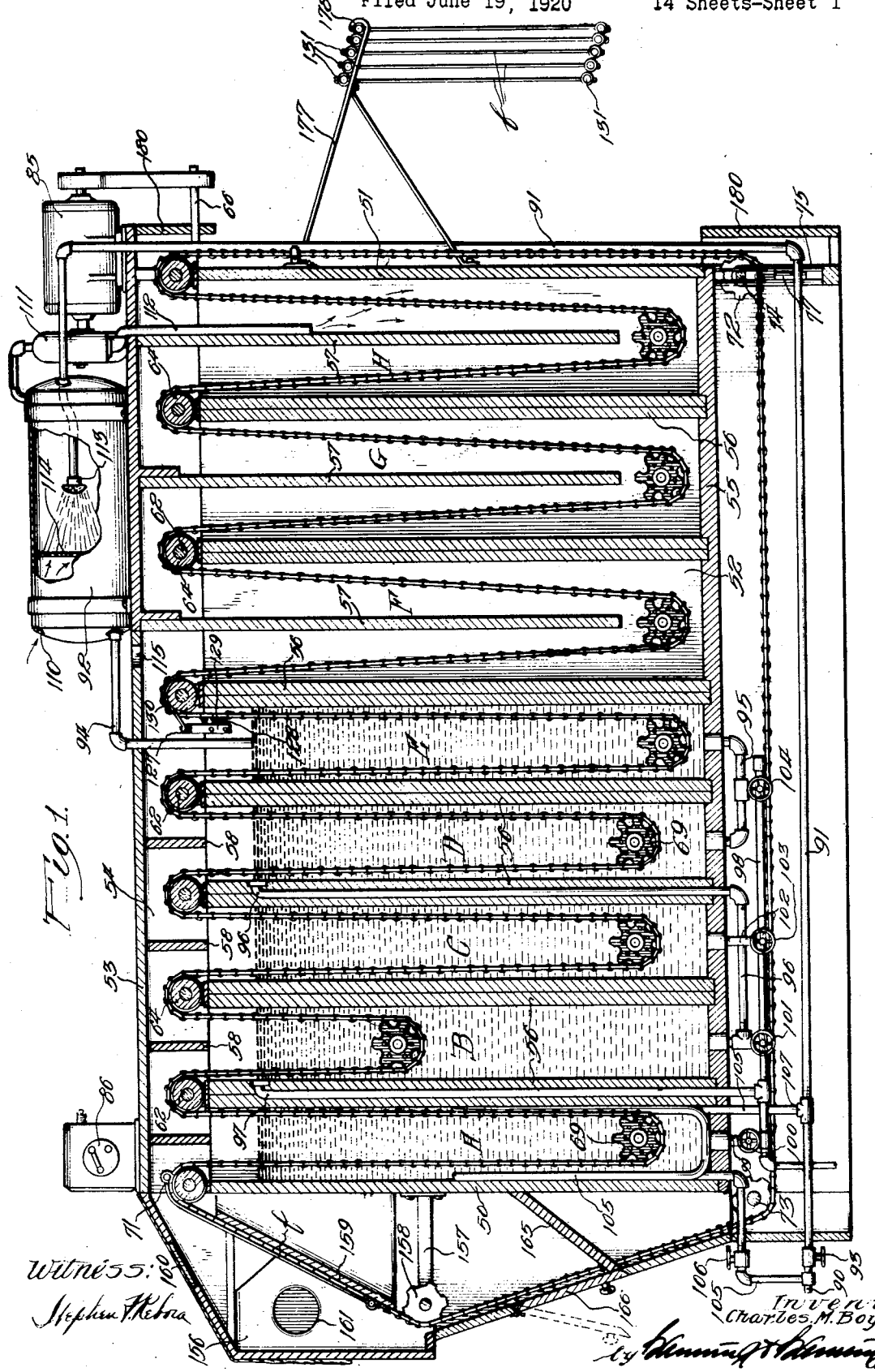

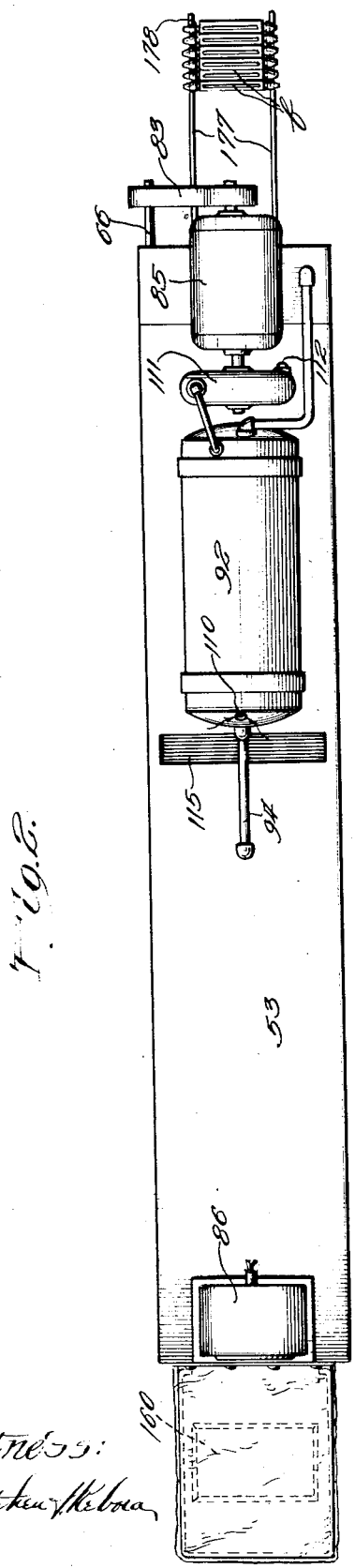
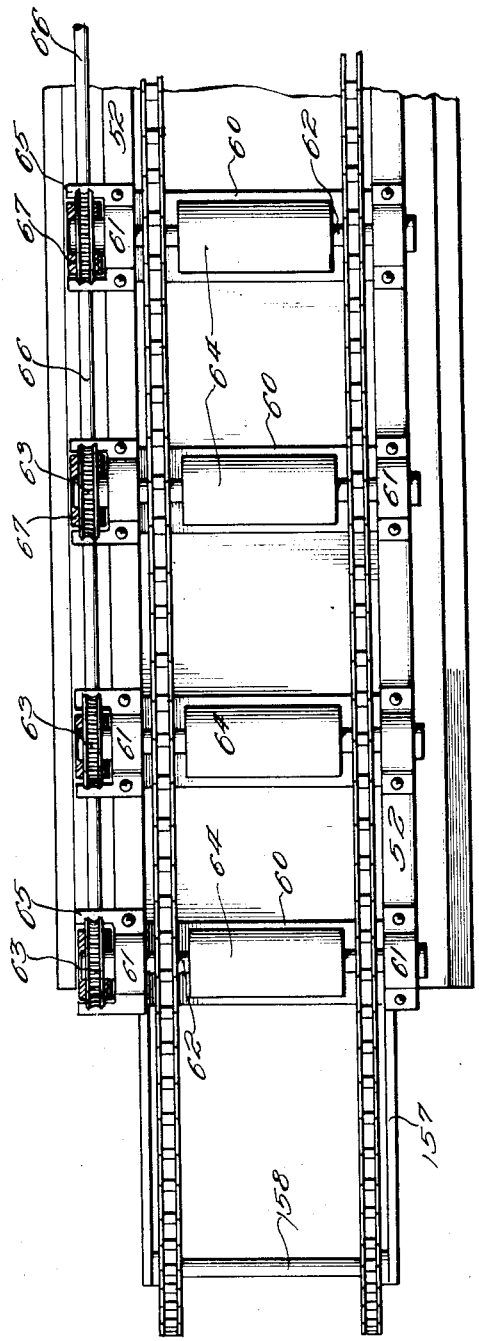

Feb. 3. 1925.
C. M. BOYCE
CONVEYER
Filed June 19, 1920     14 Sheets-Sheet 4
1,525,363
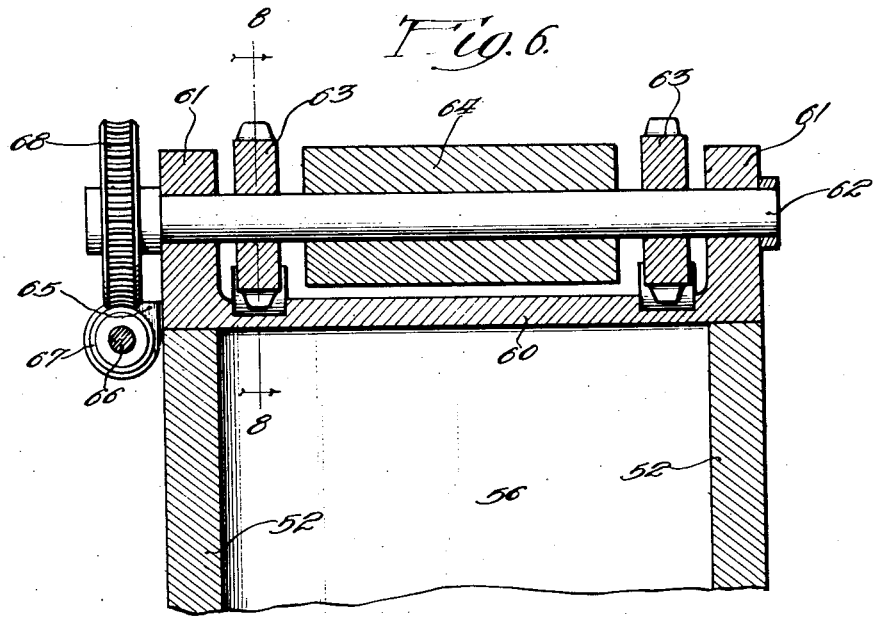
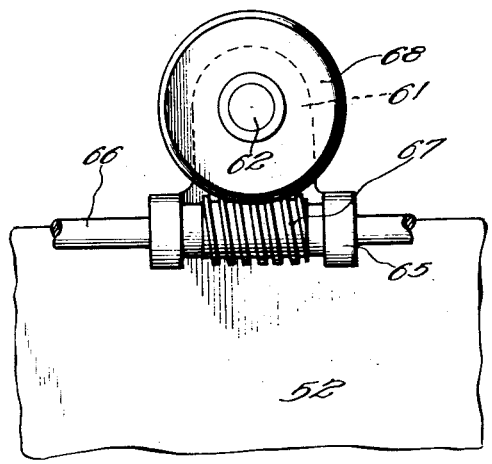
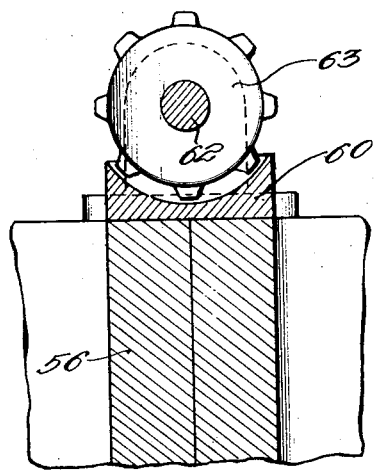
Inventor.
Charles M. Boyce.

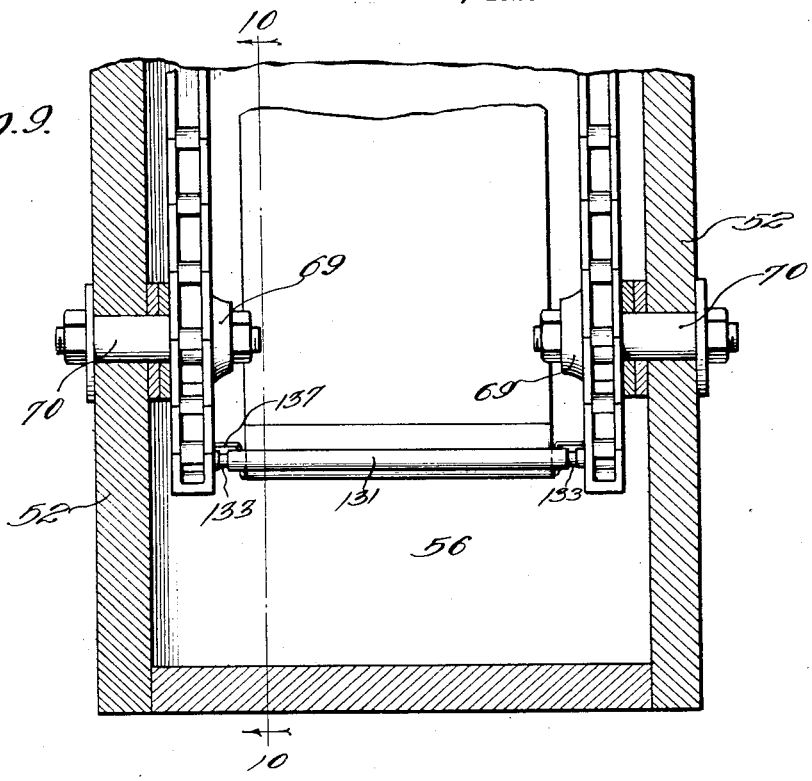
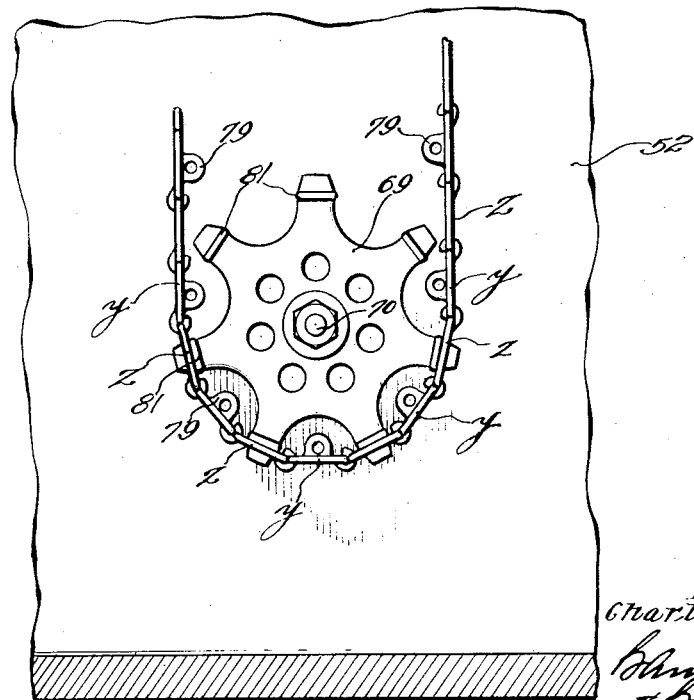

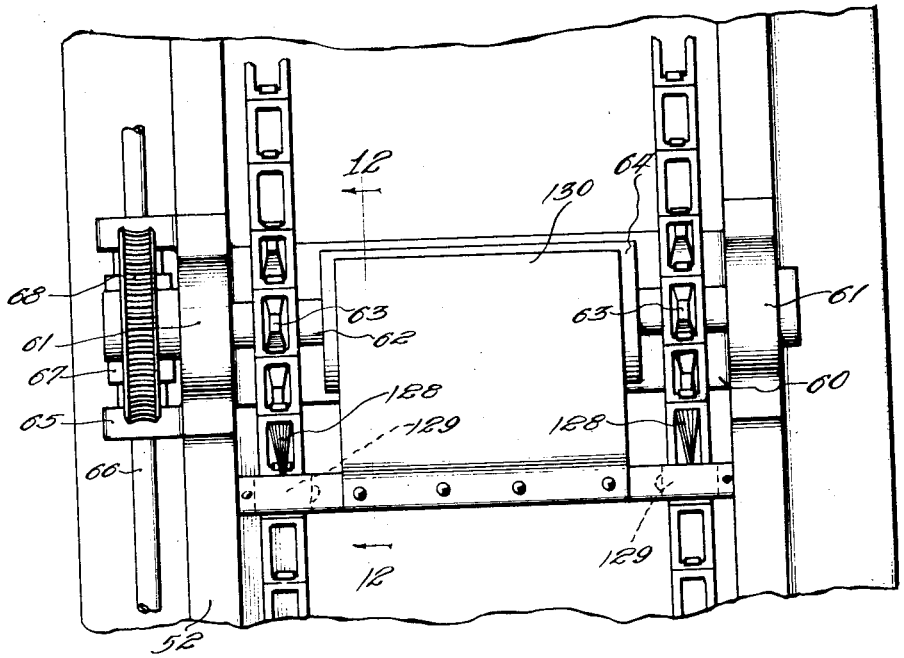
Fig. 11.
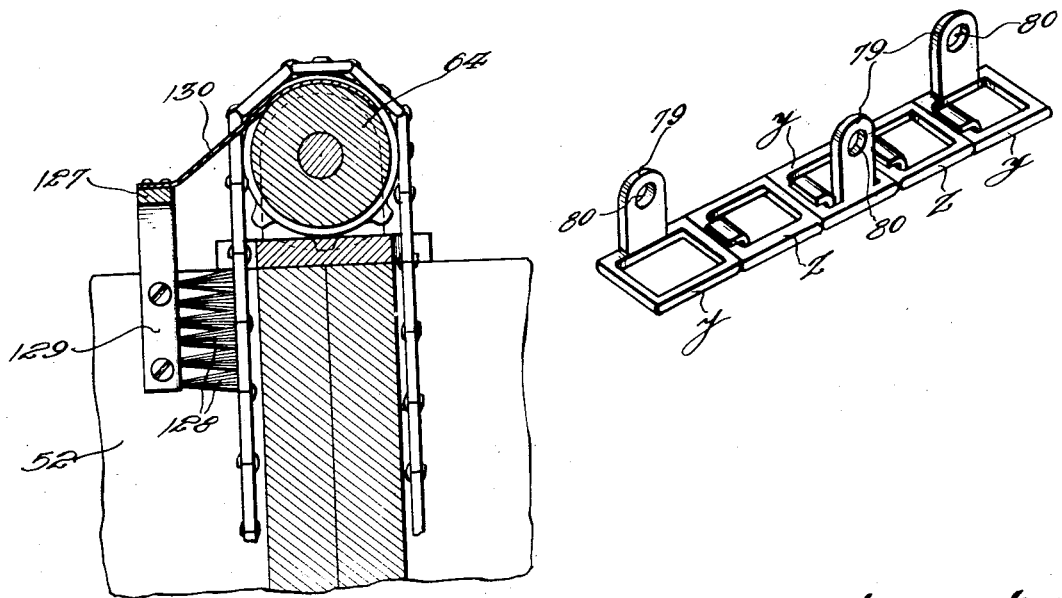
Fig. 12.
Fig. 13.

Feb. 3, 1925. 1,525,363
C. M. BOYCE
CONVEYER
Filed June 19, 1920 14 Sheets-Sheet 7

Witness:
Stephen H. Rebora

Inventor.
Charles M. Boyce.

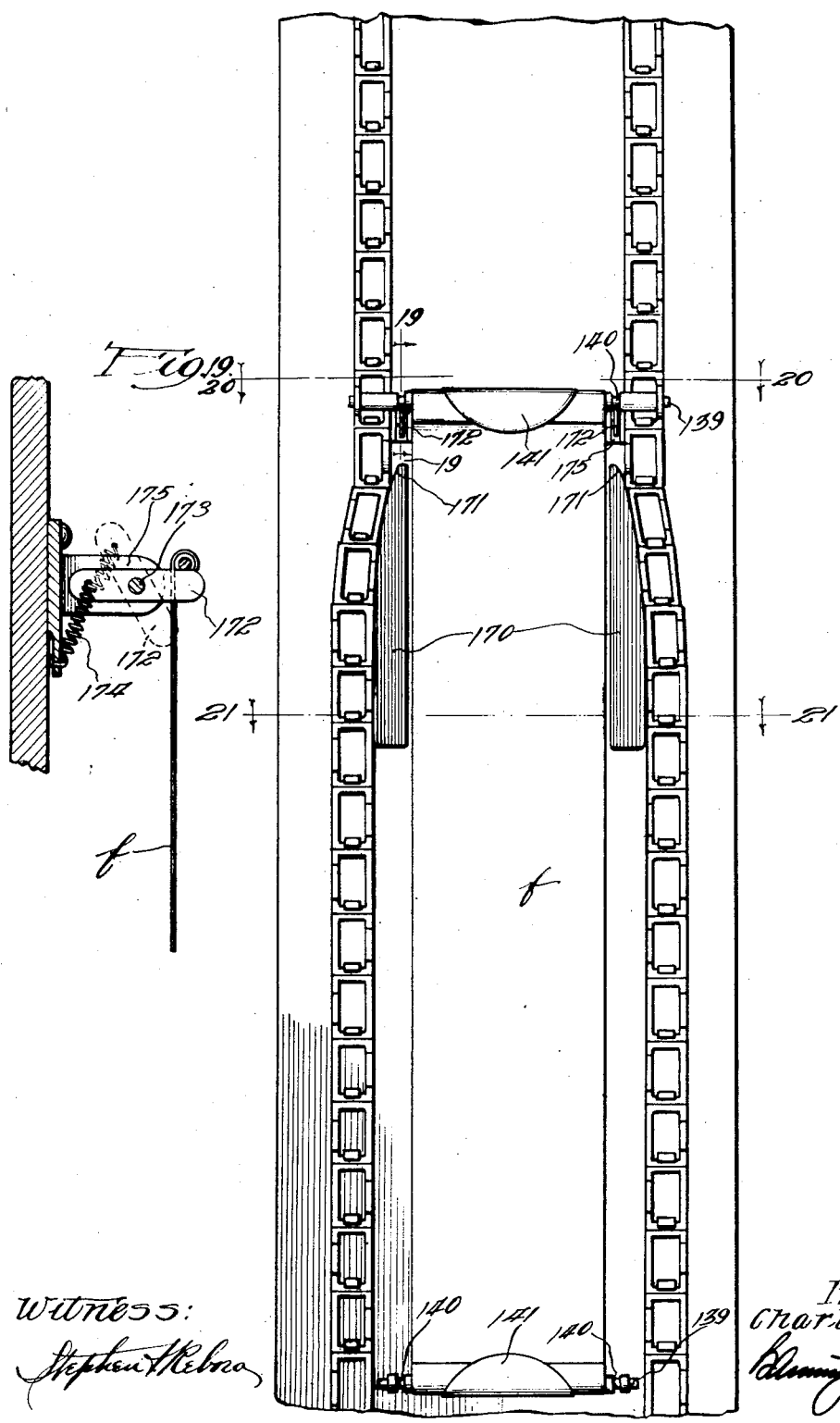

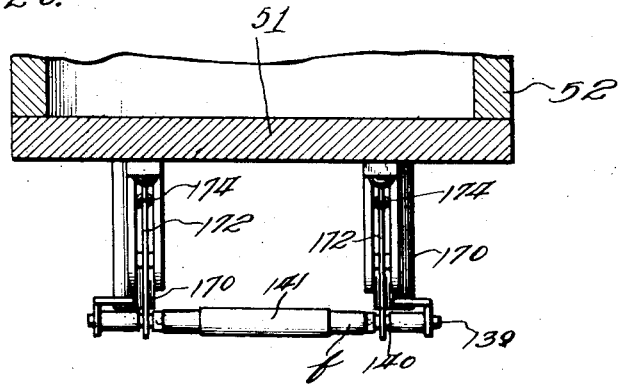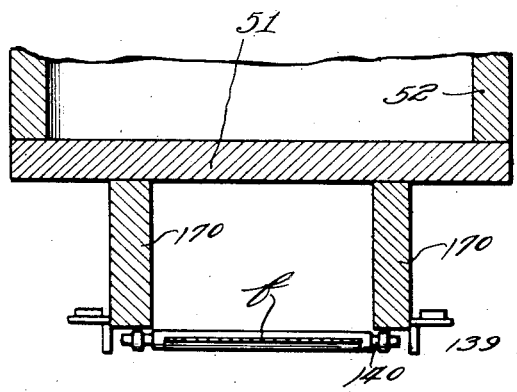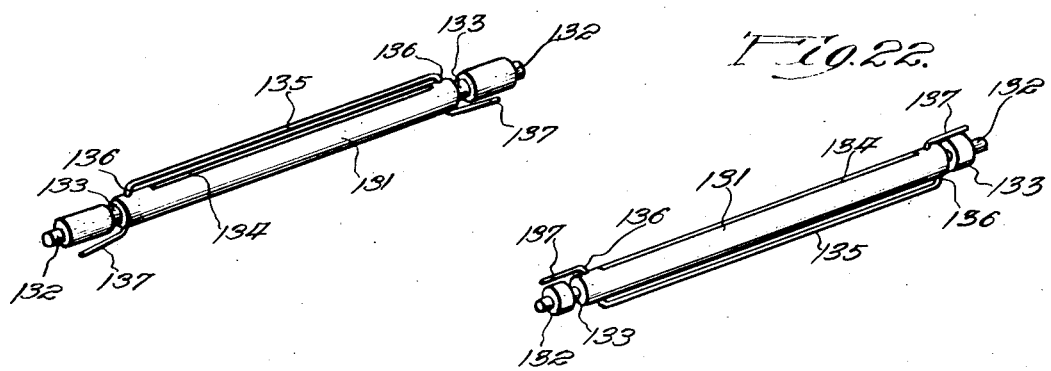

Feb. 3, 1925.  1,525,363
C. M. BOYCE
CONVEYER
Filed June 19, 1920 14 Sheets-Sheet 10
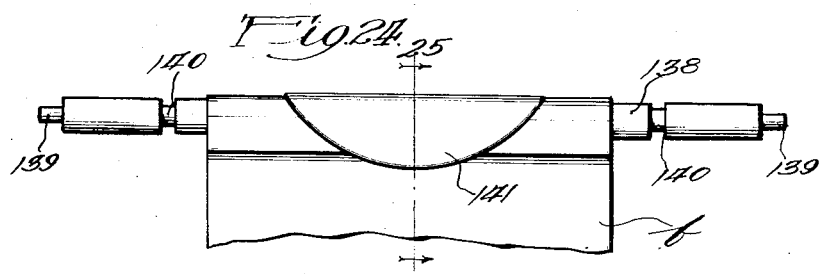
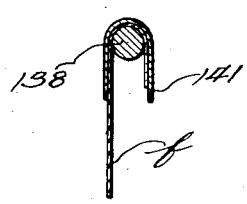
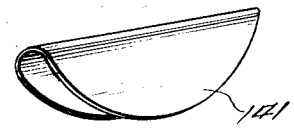
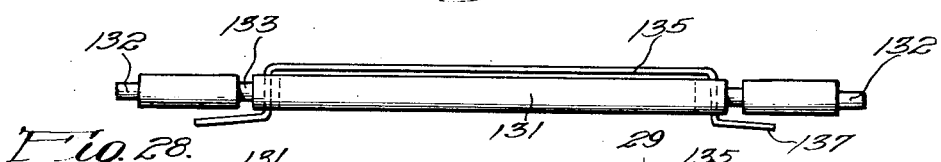
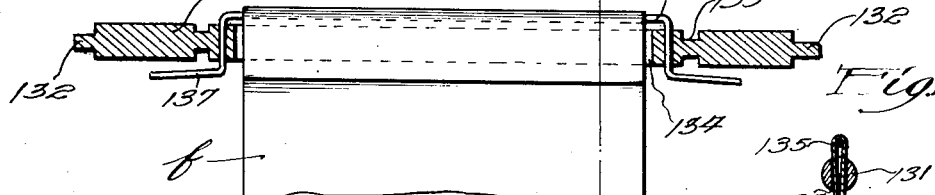
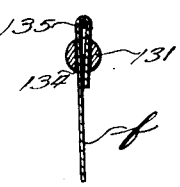
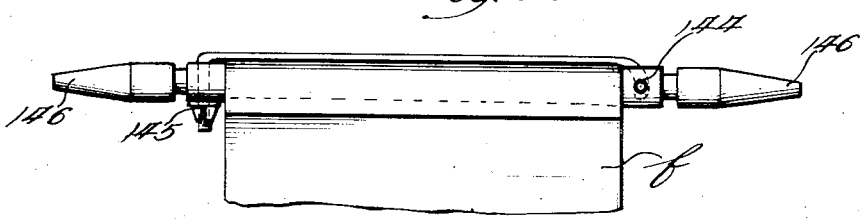
Inventor:
Charles M. Boyce.

Feb. 3, 1925. 1,525,363
C. M. BOYCE
CONVEYER
Filed June 19, 1920 14 Sheets-Sheet 11

Witness:
Stephen J. Kelma

Inventor.
Charles M. Boyce.
Attys

Feb. 3, 1925.                                      1,525,363
C. M. BOYCE
CONVEYER
Filed June 19, 1920        14 Sheets-Sheet 12

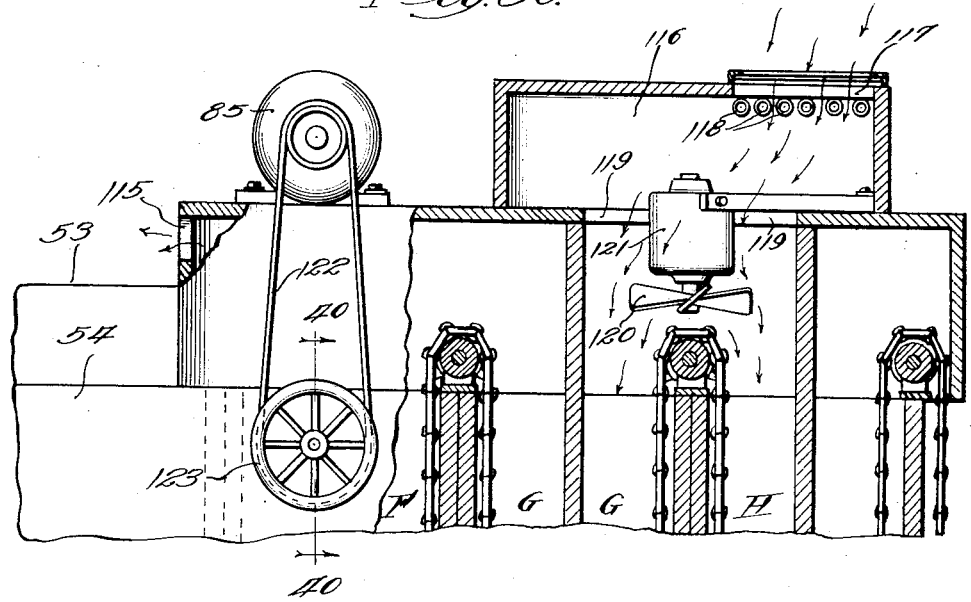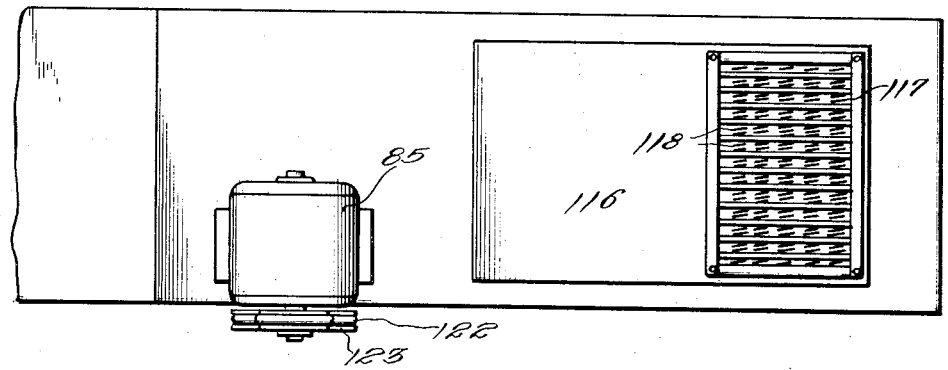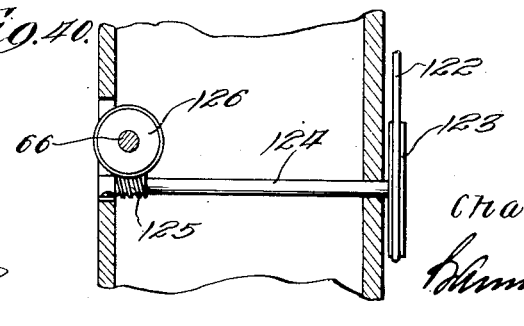

Feb. 3, 1925.  1,525,363
C. M. BOYCE
CONVEYER
Filed June 19, 1920    14 Sheets-Sheet 14
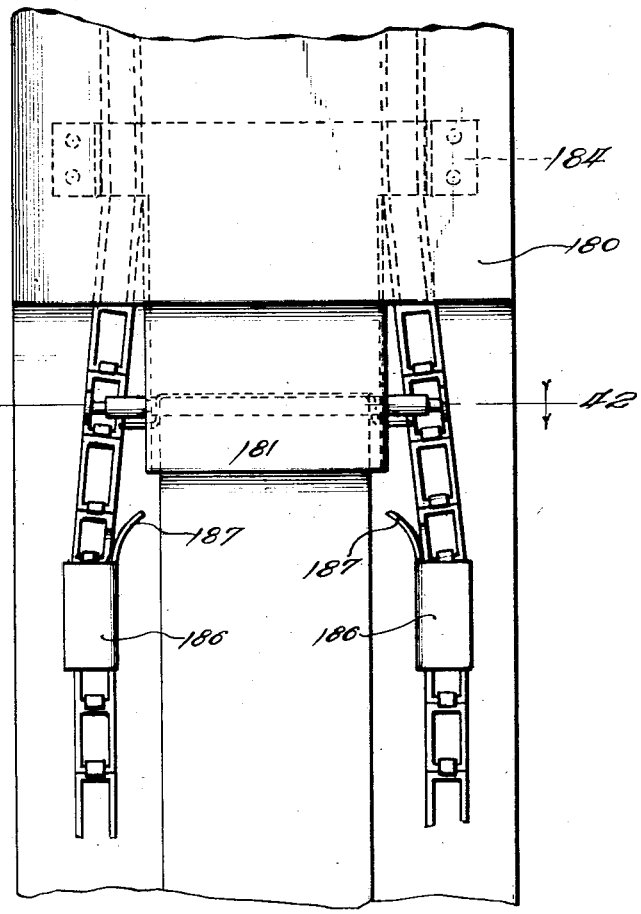
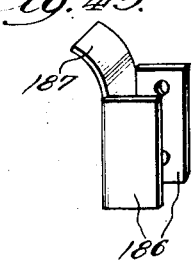
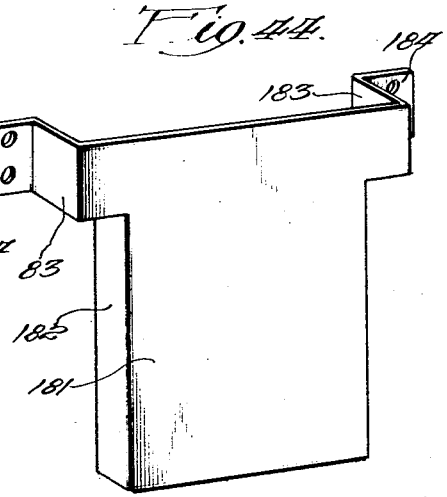
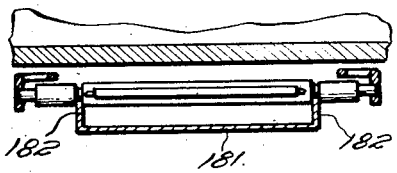
Inventor:
Charles M. Boyce.

Patented Feb. 3, 1925.

1,525,363

UNITED STATES PATENT OFFICE.

CHARLES M. BOYCE, OF HAZEL CREST, ILLINOIS, ASSIGNOR TO THOMAS J. BOYCE, RECEIVER FOR THE BOYCE CHEMICAL LABORATORIES, INC., OF HARVEY, ILLINOIS, A CORPORATION OF ILLINOIS.

CONVEYER.

Application filed June 19, 1920. Serial No. 390,202.

*To all whom it may concern:*

Be it known that I, CHARLES M. BOYCE, a citizen of the United States, residing at Hazel Crest, in the county of Cook and State of Illinois, have invented certain new and useful Improvements in Conveyers, of which the following is a specification.

This invention relates to a conveying machine or apparatus designed especially for use in the development and drying of negative photographic films of varying widths and lengths, such as are commonly used in amateur cameras and photographic circuit cameras. The purposes, objects, and advantages derived from this invention will be revealed hereinafter in the specification and claims, and in the accompanying drawings in which is illustrated an exemplification of the invention in the manner following:

Figure 1 is a longitudinal vertical section through the machine in its entirety;

Fig. 2 is a plan view thereof;

Fig. 3 is a plan view, enlarged, of the front or receiving end of the machine, the cover and hood being removed to exhibit the interior parts;

Fig. 4 is an elevation of the front or receiving end of the machine partly broken away to exhibit certain interior parts;

Fig. 5 is an elevation of the rear or delivery end of the machine;

Fig. 6 is an enlarged sectional view through one of the sprocket shafts at the top of the machine;

Fig. 7 is an end view thereof showing the worm drive for the sprocket shaft;

Fig. 8 is a sectional view taken on line 8—8 of Fig. 6;

Fig. 9 is a detail view in section showing a pair of idler sprockets within one of the compartments of the machine;

Fig. 10 is a sectional view taken on line 10—10 of Fig. 9;

Fig. 11 is a fragmentary plan view of the film wiper, and Fig. 12 is a sectional view thereof taken on line 12—12 of Fig. 11;

Fig. 13 is a detail in perspective of a few of the links composing the chain which operates as a conveyer for the films;

Fig. 18 is an enlarged view in elevation looking toward the rear end of the machine;

Fig. 19 is a detail in section taken on line 19—19 of Fig. 18;

Figure 32:
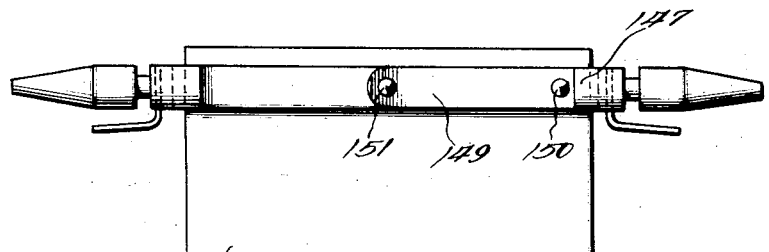
Figure 33:
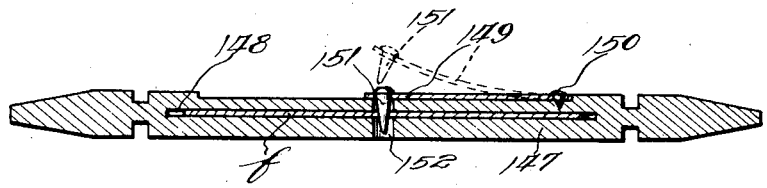
Figure 34:
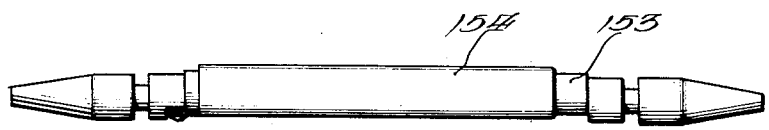
Figure 35:
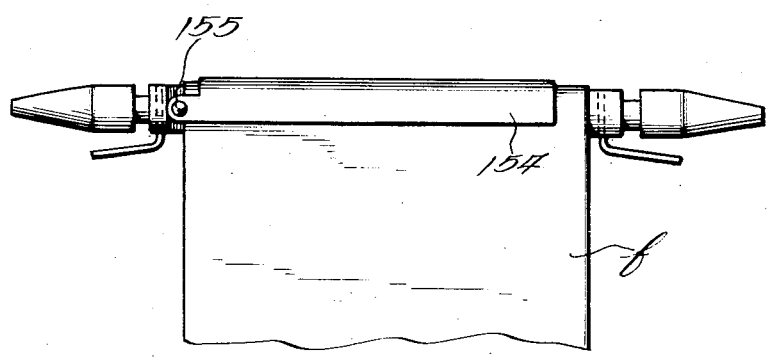
Figure 36:
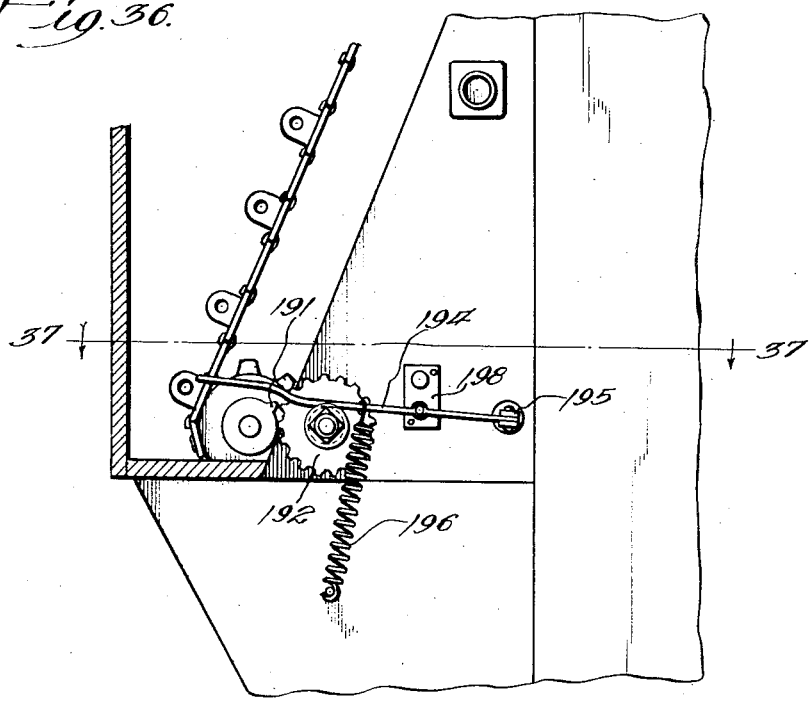
Figure 37:
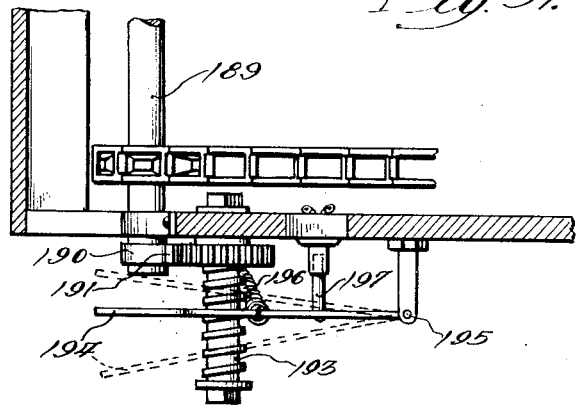

Figs. 20 and 21 are horizontal sections taken, respectively, on lines 20—20 and 21—21 of Fig. 18;

Figs. 22 and 23 are perspective views of front and rear film carriers respectively, exhibiting one form of construction;

Fig. 24 shows in elevation a rear carrier, such as appears also in Fig. 18, exhibiting one construction of attaching means for the film;

Fig. 25 shows a transverse section taken on line 25—25 of Fig. 24;

Fig. 26 shows in perspective the clip that is applied to the film carrier of Fig. 24;

Figs. 27 and 28 illustrate in elevation and longitudinal section, respectively, another form of film carrier, and Fig. 29 is a transverse section therethrough;

Figs. 30 and 31 are plan and side elevations, respectively, of still further modifications of the film carrier;

Figs. 32 and 33 represent, respectively, an elevation and longitudinal section of another form of film carrier;

Figs. 34 and 35 also show in plan and elevation, respectively, another modified construction of film carrier;

Fig. 36 is a side elevation of a mechanically operated means for controlling the switch of the motor which drives the conveyer, Fig. 37 being a sectional view thereof taken on line 37—37 of Fig. 36;

Fig. 38 is a detail, partly in section and partly in elevation, representing a modification of the drying system elsewhere shown in Fig. 1;

Fig. 39 is a plan view of the parts shown in Fig. 38;

Fig. 40 is a detail in section taken on line 40—40 of Fig. 38;

Fig. 41 represents a detail in elevation looking toward the rear end of the machine and exhibiting a modified construction of take-off mechanism;

Fig. 42 is a sectional view taken on line 42—42 of Fig. 41;

Fig. 43 is a perspective view of one of the chain spreading devices shown in Fig. 41; and Fig. 44 is a perspective of the carrier guide used with the construction of Fig. 41.

The arrangement of the various mechanisms comprised in this invention, and their relation to each other and to the entire machine, may best be understood by referring to them individually, then collectively, and accordingly the description to follow will take up in order (1) the general assembly; (2) the conveying mechanism; (3) the water circulating system; (4) the drying apparatus; (5) the film carriers; (6) the receiving hood; (7) the take-off mechanism; and (8) certain observations with reference to the apparatus in its entirety.

*General assembly.*

As shown most comprehensively in Fig. 1, the machine is in the general form of a cabinet that is relatively long, high and narrow. The wall at its receiving end is designated as 50, at its delivery end is a wall 51, between the two ends are walls 52, and over the structure thus formed is a top or cover 53 having sides 54 which extend down a short distance to rest upon the top edges of the end and side walls of the cabinet. Arranged slightly above the base line of the cabinet is a bottom, designated as 55, the sides and ends being suitably extended below the bottom to provide therebelow a space for the accommodation of certain parts.

Extending transversely between the side walls of the cabinet are a series of parallel partitions 56 providing a plurality of vertical compartments, some of which are designed to hold liquid and are appropriately lined or surfaced for this purpose. The precise construction of the cabinet and its partitions, as well as the character of the lining or surfacing for the compartments is of relative unimportance to this invention and accordingly will not be further described.

The compartment adjacent the receiving end of the cabinet, designated as A, is intended to receive a developing solution; the next compartment B is for water; the next compartment C holds a fixing solution; and the next two compartments, D and E, respectively, also contain water. Three additional compartments F, G, and H, are situated at the rearward end of the cabinet, each being subdivided by a vertically extending partition 57 which extends downwardly from the cabinet top well toward its bottom. By this construction, each compartment, F, G, and H, is provided with two passages connecting only at the bottom, the adjacent compartments, however, maintaining communication at their upper ends, so that the entire series of passages in these duplex compartments present a zigzag course. The films to be treated are required to travel down and up through the liquid body contained in each of the first five compartments and thereafter through a zigzag course defined by the duplex passages of each of the last three compartments. Additionally the cover is provided with a number of short transverse partitions 58, in the nature of baffles, one disposed intermediately of each pair of compartment partitions 56, the lower end of each upper partition terminating at about the plane of the upper end of the lower partitions. The partitions 58 in combination with the adjacent parts act to prevent light from traveling or being reflected longitudinally of the cabinet, and are provided for this purpose so as to protect the films undergoing treatment.

*The conveying mechanism.*

As a means of advancing the films through the machine, I have shown in Fig. 1 and elsewhere a conveyer which may take the form of a pair of endless chains, designated as $x$, which are arranged to traverse each of the various compartments that have been described. These chains are mounted to travel over suitable sprocket wheels by which means they are kept apart a uniform distance while traveling together. The mounting of the sprocket wheels is clearly illustrated in Figs. 6, 7, and 8 where I have shown a base plate 60 adapted for positioning on the top of one of the partitions 56 within the machine, each end of the base being upturned to provide a bearing wall 61 in which is carried one end of a rotatable shaft 62 equipped with a pair of spaced sprocket wheels 63, each fast on the shaft, a roll 64 being arranged between the two sprockets. Extending laterally from one end of the base plate is a bracket formed to provide a bearing 65 for a drive shaft 66 that extends longitudinally of the machine, and on this shaft are a plurality of worms 67, one for each sprocket shaft 62 which is equipped with a gear 68 in operative relation to the worm. As appears best in Figs. 1 and 3, a series of sprocket shafts 62 are provided, one mounted upon each vertical partition 56, there being a like number of worms 67 on the drive shaft 66, so that all the sprocket shafts are driven in unison.

Within each compartment, in its lower portion, as shown in Fig. 1, I have also provided a pair of sprocket wheels 69, the details of construction being best shown in Figs. 9 and 10. These lower sprockets which are idlers may each be mounted adjacent a side wall of the machine upon a stub axle 70, as shown. These idler sprockets are arranged opposite each other in pairs, and engage the chains in each of the various compartments so as to direct their travel adjacent the partitions 56 and always at a uniform distance apart. The height at which these idler sprockets are mounted within the various compartments may be determined by what is found desirable. In compartment B, for instance, where the film is passed through a bath of water, the idler sprockets are relatively high so as to shorten the course of travel therein, as it is not necessary to wash the films for any great length of time after being immersed in the developing solution.

Figure 14:
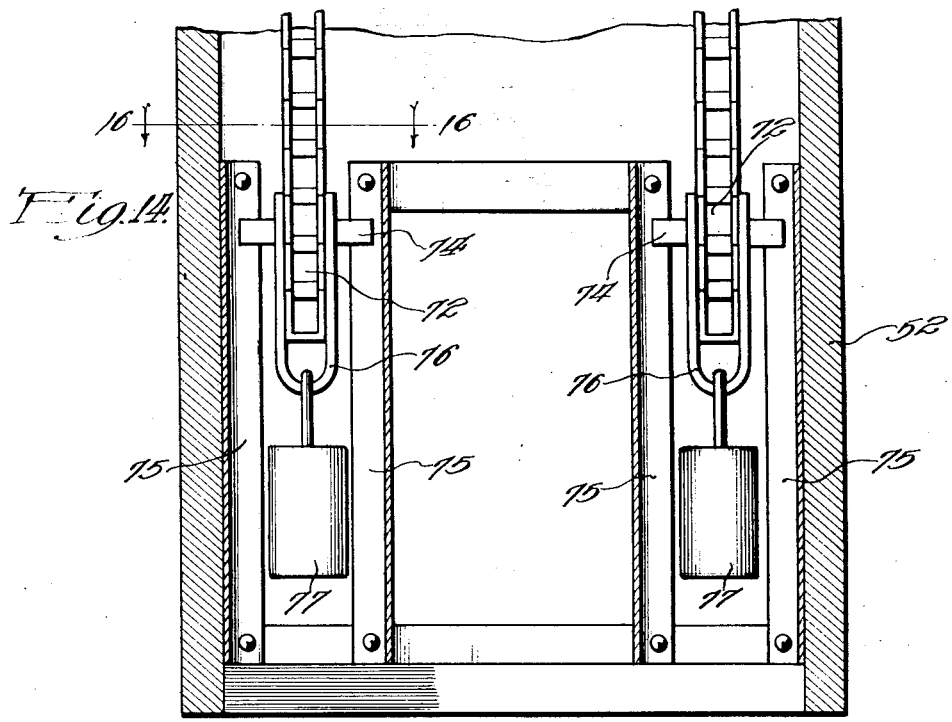
Fig. 14 is a sectional view taken transversely of the machine at its rear lower end, showing the device used to keep the conveyer taut.
Figure 15:
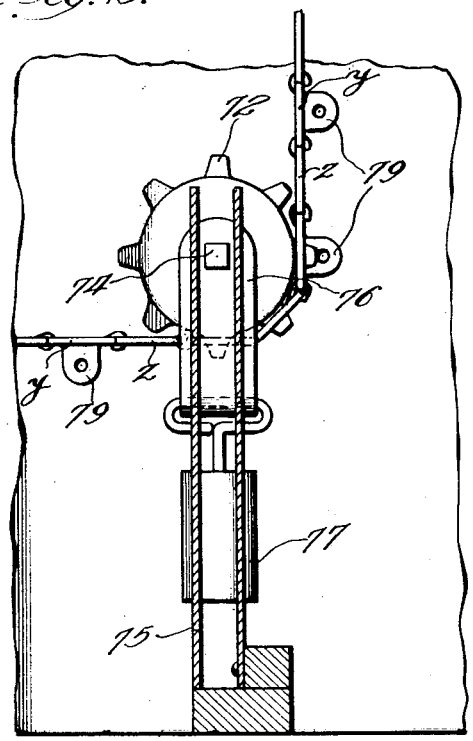
Fig. 15 shows the same device, being a sectional view taken at right angles to that of Fig. 14.
Figure 16:
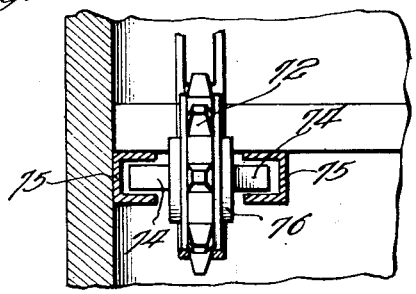
Fig. 16 is a sectional view taken on line 16—16 of Fig. 14.
Figure 17:
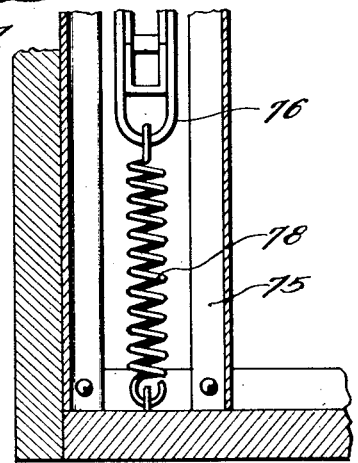
Fig. 17 is a view similar to Fig. 14, but exhibiting a modified construction.

The two chains enter the machine at its receiving end through an opening 71 at the end of the cover, and pass over and around every upper pair of sprockets, and below and around every lower pair of idler sprockets; thereafter they pass out of the machine at its delivery end where an exit opening is provided in the cover. Descending upon the outer side of the machine at this end, the chains are passed around idler sprockets 72 and thence below the bottom 55 to the receiving end where they pass around other idlers 73 preliminary to an upward turn to the first driving sprockets. The rear idler sprockets 72 are specially formed, as will appear best by reference to Figs. 14 to 17 inclusive, wherein each is shown to be mounted upon an axle 74 whose ends are preferably squared to be received slidingly within a pair of guideways wherein the sprocket is permitted to move up or down. Upon a yoke 76 suspended from the axle a weight 77 is carried so as to draw the sprocket downwardly, and thereby take up any slack that may exist in the chain associated therewith. Each of the sprockets 72 is formed alike, but is mounted to act independently of the other. The construction just described is illustrated in Figs. 14 to 16 inclusive, but may be modified, if desired, by the substitution of a spring 78, as shown in Fig. 17, the other parts remaining the same. In either case, the means described operate to maintain the chains relatively taut throughout their entire length.

At this point it will be useful to refer to Fig. 13 which is a close-up in perspective of five links of the chain. As shown, certain of these links which are individually designated as $y$ are each provided with an upstanding lug 79 having near its outer end a hole 80, the purpose of which will hereinafter appear. The lugs are by preference arranged in alternation first upon one side of the chain, and then on the other, a more comprehensive view of the chain so formed being afforded in Fig. 18, wherein it will appear that the inside lugs are arranged in pairs as are also the outside lugs. Between each pair of links $y$, I prefer to employ a plain link $z$ which co-operates in a special manner with each of the idler sprockets 69. As shown in Fig. 10, each of these idlers is provided with teeth spaced apart a distance of two chain links, a shoulder 81 being formed relatively close to the outer end of each tooth. In passing around these sprockets, the teeth enter the plain links $z$, but only slightly, as the shoulders 81 hold away from the body of the sprocket these links $z$, as well as the intermediate links $y$ with their lugs 79.

The drive shaft 66, as already stated, extends longitudinally of the machine and carries a pulley 82 (see Fig. 5) over which runs a belt 83 which transmits power from a pulley 84 that is carried on the shaft of a motor 85 which may conveniently be mounted on the cover of the machine. The character of the worm and gear transmission that I have described is such as to impart very slow rotary movements to each of the sprocket shafts 62, the effect being to move the two chains very slowly through the machine, the speed of which is determined more or less in accordance with the time required for the developing, washing, fixing, and subsequent drying of the films to be treated. If desired, a time switch 86 may be employed to assure operation of the motor for a limited time only, such as might be necessary for the travel of a film through the machine but no further.

*The water circulation system.*

It is desirable that the water used in the compartments B, D, and E should be replenished either constantly or periodically, and also that means be provided for using this same water as a cooling medium to maintain the developing solution at a relatively low temperature such as is required in the treatment of photographic films. With these ends in view I have arranged a system for the supply and distribution of water which is best illustrated in Fig. 1, and which comprises parts as follows:

Water is delivered from any suitable source to the inlet end 90 of a pipe line 91 which passes through the space below the bottom 55 to the rearward end of the cabinet and thence upwardly to a tank 92 which may be conveniently positioned upon the cover of the machine. A shut-off valve 93 is arranged near the inlet end of the pipe, the purpose of which is, if desired, to shunt the water through a by-pass that will presently be described. Leading from the tank 92 is a pipe 94 which discharges into the compartment E which maintains communication with the adjacent compartment D as by means of a connecting pipe 95 which connects with their respective bottoms, as shown.

An overflow pipe 96 is arranged to lead water from the upper portion of compartment D into the lower end of compartment B, from whose upper end a take-off pipe 97 leads to a drain pipe 98 through which excess of water may waste. Leading from the bottom of compartment A to the drain pipe is a connection 99 that is equipped with a valve 100, as shown, to control the escape of developing solution. Likewise there is a connection controlled by a valve 101 that leads from the compartment B to the waste pipe; a similar pipe connection 102 controlled by a valve 103 leads from the compartment C to the waste pipe; and a connection controlled by a valve 104 leads to the waste pipe from the pipe 95 which connects with the bottoms of the two compartments D and E. By this arrangement the liquid within all compartments A to E inclusive, may be drained through the waste pipe whenever the controlling valves are opened for this purpose. When these valves are not open, however, the supply of developing and fixing solutions remains unchanged, and water is required to circulate at a common level within the three compartments E, D, and B, from the latter of which excess is taken off through the waste pipe as explained.

Combined with the circulation system just described is a by-pass that is arranged as follows: Leading from the pipe line 91 adjacent its inlet 90 is a pipe 105 equipped with a shut-off valve 106, this pipe entering the bottom of compartment A adjacent the end wall 50 and proceeding upwardly therein a desired distance and then downwardly again to form a coil which also extends across the bottom of the compartment and over to the partition 56 on its opposite side where it again proceeds upwardly and then downwardly to form another coil, the pipe thereafter emerging from the bottom of this compartment to connect as at 107 with the pipe line 91. When the valve 93 is shut off, and the valve 106 is opened, the water is required to circulate through the coil 105 to lend its temperature influence to the developing solution within the compartment A; thereafter it enters the pipe line 91 to travel into the tank 92 in the manner already explained. It may be desirable to make use of this by-pass during the warm weather, or when the developing solution would normally attain a temperature that is unsuited for the treatment of films, and consequently it is provided for just such purposes.

*The drying apparatus.*

The films which are first subjected to a proper chemical treatment are thereafter dried in the machine during their travel through the compartments F, G, and H, each of which contains two passages. Within these three compartments there is maintained a circulation of dehumidified air such as to thoroughly dry the films preliminary to their delivery from the machine.

In the accomplishment of drying the films, I utilize the tank 92 into which air is received through an opening 110 and from which it is educted by an exhaust fan or blower 111, and thereafter conducted through an exhaust pipe 112 for delivery into the rearmost passage of the compartment H. Interiorly of the tank the discharge end of the pipe 91 is fitted with a nozzle or sprayer 113 which delivers the water in a finely divided condition upon a foraminous baffle plate 114, preferably of screen material, and it is through this same screen, but in the reverse direction, that the air entering the opening 110 is drawn under the action of the fan 111. As a result of this construction within the tank and of the action of the water upon the air, the latter is washed, cooled, and dehumidified prior to entering the drying compartments, so as to be properly conditioned to act upon the films which are passed through the machine. The air current proceeds downwardly through the rearmost passage of the compartment H and upwardly again through its forward passage, and then enters the compartment G at the top through which, as well as the compartment F, it follows similar courses, its exit from the cabinet being through an opening 115 formed in the cover, as shown.

The drying apparatus just described may take other forms, however, one of which is suggested in Figs. 38 to 40 inclusive. In this instance it is arranged independently of the water circulating system and accordingly is unaffected thereby.

Referring now to Fig. 38, which illustrates the machine at its rear upper end, it will be noted that use is made of a chamber 116 formed by the use of appropriate walls, an inlet opening 117 for air being provided, as shown. In the path of the incoming air is arranged a plurality of heating coils 118 which raise the temperature of the air as it is taken into the machine for drying purposes. This chamber within which air is heated communicates as at 119 with each of the compartments G and H, and the heated air is delivered thereinto with the aid of a fan 120 which may be driven directly from a motor 121 mounted in place, as shown. The air circulation in this construction proceeds two ways, one current passing out at the rear end of the machine with the chains and the other proceeding forwardly to leave at the opening 115. In other respects, this drying system follows the construction shown in Fig. 1, in that the air is circulated through the same passages, and performs the same action upon the films. In cases where it is desired that the air should be heated in preference to being dehumidified, the arrangement of Fig. 38 may be employed. It should be understood, however, that, if desired, a combination of the constructions shown in Figs. 1 and 38 may be arranged so as to deliver into the machine air for drying purposes which is both dehumidified and heated.

Inasmuch as the heating chamber shown in Fig. 38 is located where the driving motor 85 is shown in Fig. 1, I have, in the former figure, relocated the motor 85 so as to transmit its power to the several sprocket shafts as by means of a belt 122 which drives a pulley 123 that is secured to a shaft 124 having on one end thereof a worm 125 which is in mesh with a gear 126 that is mounted on the drive shaft 66 all as clearly indicated in Fig. 40. The construction just described co-operates with the same drive that is elsewhere shown for moving the conveyer through the machine.

In connection with the apparatus which effects a drying of the films, certain mechanical means are employed to remove a considerable proportion of the water remaining on the chains and films as they emerge from the bath in compartment E. As best illustrated in Figs. 11 and 12, these means comprise by preference a frame in the form of a U-shaped bar 127 arranged transversely of the machine with its ends secured to the side walls 52 near their upper ends. Carried within the frame thus formed are a pair of brushes 128 whose backs 129 are secured adjacent the ends of the frame so as to present their brushing elements against the two chains. The object of this construction is to remove from the chains such liquid as may be easily brushed off so as to prevent the same from being carried into the drying compartments. Mounted on the frame is a wiper 130 which is extended over and partially around the roll 64 that is carried upon the adjacent sprocket shaft. This wiper, by preference, is in the form of a sheet of chamois skin, and is arranged to contact with every portion of the proximate side of the films that pass through the machine. Under the action of such a wiper a large proportion of the moisture which the film would otherwise carry from compartment E is removed so as to facilitate the drying action which takes place in the remaining compartments.

*The film carriers.*

In connection with the conveyer which, in the form shown, comprises a pair of endless chains provided at intervals with outstanding lugs, use is made of a series of carriers for the film, one for each end thereof. In Figs. 22 and 23 I have shown a pair of carriers, the former adopted for attachment to the front and the latter to the rear end of the film. It should be understood that these terms "front" and "rear" are used solely with reference to the film ends in the order in which they proceed through the machine.

The front carrier shown in Fig. 22 is in the form of a spindle 131 with its two ends 132 reduced to form in effect pins which may enter the openings 80 in the chain lugs 79. An annular groove 133 is provided near each end, as shown. Formed within the spindle is a longitudinal slit 134 through which the front end of a film $f$ may be introduced (see Fig. 29), I have also arranged adjacent one side of this slit a wire 135 whose ends 136 are bent at right angles to pass through openings that are formed transversely of the spindle, the wire extremities 137 being turned to hold the wire in place and to lie adjacent the chain so as to prevent any extended turning of the spindle with consequent winding of the film thereon. The front end of the film may be looped through the spindle slit and around the wire 135, by which arrangement a tight fastening results, being more secure with increased tension of the film. The length of the carrier is designed with reference to the distance between the inside lugs 79 which project from the links of the chain, the spindle ends being adapted to lodge within the openings of the lugs so as to hold the carrier securely between the chains during travel of the film through the machine.

Referring now to Fig. 23 which exhibits the rear carrier, it will be noted that it is formed in all respects like the front carrier, and accordingly its corresponding parts are designated similarly. The rear spindle, however, is of slightly greater length so as to be carried between a pair of outside lugs 79 projected from the chains. In arranging the film in place between the front and rear carriers, the rear end of the film may be drawn around the wire 135 sufficiently to take up slack in the film, it being understood, of course, that the rear carrier should be positioned between a pair of lugs that are spaced from those supporting the front carrier a distance approximating the length of the film. In Fig. 1, I have shown a film $f$ as attached in place between the front and rear carriers and in the position of just starting on its travel through the machine.

The carriers shown in Figs. 22 and 23 may take other forms, however, as suggested in Figs. 24 to 35 inclusive. As there is no difference between the constructions of the front and rear carriers, except as to length, these figures which will now be described may be regarded as exhibiting either spindle of a pair of carriers.

In Figs. 24, 25 and 26 the construction includes a spindle 138 having its ends reduced or tapered as at 139 to enter within the apertured lugs of the chain, and is further provided with an annular groove 140 near each end, as shown. The film end is attached in place by being looped around the spindle and then held thereon as by means of a spring clip 141, the form of which is best shown in Fig. 26. In this construction, it is unnecessary to have any slit through the spindle, the film lying entirely to the outside thereof.

Figs. 27 to 29 disclose the same construction as that shown in Figs. 22 and 23, but are presented to more clearly illustrate the manner of fastening the film end thereto. In Fig. 29, for instance, the film end is shown as looped through the slit formed longitudinally through the spindle and around the wire which is adjacent one edge of the slit, the manner of attachment being such that any increase in tension of the film results in its being more firmly clamped in place.

Referring now to Figs. 30 and 31, use is made of a spindle 142 similar to that elsewhere shown, but provided with a wire 143 that is hinged thereto at one end as at 144, the opposite end of the wire being turned to pass through the spindle and be locked thereto as by means of a screw 145. In applying the film end in place, it is looped around the spindle, the hinged wire is then pressed down over the film and the screw is applied to the wire end to draw it tightly upon the film in a manner that will be readily understood from the drawing. In these figures, as well as in certain of the others, the spindle ends 146 are shown to be tapered to fit within the lug opening 80, this being an alternative construction.

Another form of carrier is suggested in Figs. 32 and 33, wherein the spindle 147 is formed with a longitudinal slit 148 adapted to receive the end of the film. Upon one side of the spindle is secured a spring arm 149 preferably fastened in place at one of its ends by a screw 150 or other attaching medium which enters the spindle at a point remote from its center. The opposite end of the spring arm is provided with a pin 151 adapted to enter within an opening 152 that is formed transversely of the spindle in intersecting relation to the slit through which the film is introduced. If desired, the spring arm may be located upon a flat or other recessed portion of the spindle, so as not to protrude beyond its cylindrical surface. According to this construction, the film end is inserted through the slit while the spring arm is held in retracted position such as is indicated by the dotted lines in Fig. 33, thereafter the spring arm is returned to its normal position, and is pressed in place to force the pin 151 through the film end so as to lock the same in place.

In Figs. 34 and 35 the spindle 153 is provided with a clip 154 hinged as at 155 and adapted to overlie the end of the film when looped around the spindle, as shown. This construction is similar to that of Fig. 24, excepting that the clip is hinged in place instead of being detachable from the spindle.

The different carrier constructions just described are suggestive of several that are suited to the requirements of this invention, it being noted that they possess the common characteristic of reduced ends so as to enter the lug openings 80, of annular grooves adjacent the ends which serve a purpose presently to be explained, and of a means for readily attaching the film ends in place preliminary to travel through the machine.

The receiving hood.

The operation of attaching the front and rear carriers to the chains may be performed within a hood 156 which is arranged upon the front end of the machine, as best shown in Figs. 1, 2, and 4. Beneath the hood is a bracket 157 extended forwardly from the wall 50 to carry a pair of idler sprockets 158 which project the two chains outwardly so as to require them to move through an angular course in passing around the receiving end of the machine, the upper portion of this course being backed by a board 159, as shown. The hood may be provided on its top side with the usual red glass 160 permitting an inspection of the interior parts, and is also draped with an opaque cloth to keep the light from entering therein. There are also arranged in the side walls of the hood openings 161 normally closed against the entrance of light, but provided with sleeves 162 permitting the operator to pass his hands inside to adjust the films in place. The front and rear carriers, as already explained, are carried respectively between a pair of inside and outside lugs 79, the chains being slightly spread apart by the operator's hands at the time the spindle ends are inserted in place. This spreading of the chains may take place only between the idlers 158 and the first sprockets 63, and at the point of take off, so that the carriers are assured of retention throughout their travel. It is to be observed that a number of films may be positioned upon the chains in the manner described, so that the machine will have capacity for handling a great many at a time. Also I would have it noted that the films are secured in place with their sensitized sides facing the operator so that in passing around the various rollers 63, it is only the reverse or back side that is touched in any way.

Below the hood but communicating therewith is a box 163 formed by the use of appropriate walls and so constructed as to preserve the hood against the entrance of light. To the inside of the two chains within the box are side walls 164 (see Fig. 4) which meet with a bottom 165 so as to provide in effect a waste receptacle into which the operator may drop the papers, spools, etc., that are removed from the films within the hood while being attached to the conveyor. Through a door 166, the contents of the waste receptacle may be taken out as necessary.

The take-off mechanism.

As a part of this invention I have provided at the delivery end of the machine means which automatically disengage the film carriers from the chains, thereafter removing the films on to a rack where they may remain until convenient for an operator to take them away. This part of the apparatus will now be considered.

Referring particularly to Figs. 18 to 21 inclusive, which illustrate certain parts that are arranged exteriorly of the rear wall 51, it will be noted that I have positioned thereupon a pair of blocks 170 each having an obliquely inclined wedge face 171 that is disposed with reference to one of the chains in such a manner as to crowd it sidewise and away from the other. As the chains move downwardly upon the rear end of the machine, they are spread apart sufficiently to disengage each of the front carriers therefrom; thereafter each film remains suspended between the chains through the medium of the rear carrier which up to the moment that it reaches the wedge blocks is still secured to the conveyer. The form of carrier illustrated in Figs. 18 to 21 inclusive is that which is elsewhere shown in Fig. 24, and as part of the take-off mechanism adapted to co-operate with carriers of this construction, I have arranged just above the spreader blocks a pair of arms 172 carried fast upon a rock shaft 173, and normally projected between the chains adjacent their inner sides so as to engage with each other as it descends. These arms are adapted to present their forward ends within the grooves 133, and to swing downwardly adjacent the tension of a spring 174 which acts to normally maintain the arms in engaging position. The rock shaft on which the two arms are mounted is suitably carried within a bracket 175 of any approved construction, such, for instance, as is suggested in Fig. 19.

The effect of the arms when engaged within the grooves of a spindle is to hold the carrier against endwise movement during the interval of time that the chains are subjected to spreading action. Were such means not provided, the spindle might disengage readily from one chain, but remain engaged with the other, thus preventing a proper take-off from the conveyer. By providing some such means as the two rocker arms, however, each spindle is held against endwise shifting while the chains are withdrawn from its ends through the medium of the wedge blocks, the result being that all the carriers, together with their attached films, may drop off the conveyer cleanly.

Associated in operative relation with the rocker arms is a rack comprising a pair of suitably supported rails 177 (see Figs. 1 and 2) which are rearwardly and downwardly extended from the wall 52, and which are provided with stops 178 at their lower ends. These rails are properly spaced to engage the ends of the rear carrier, thereby permitting the several films to slide to a rearward position, as shown in Fig. 1, where they may await removal at the hands of the operator.

A take-off mechanism which is slightly different in construction, but which operates in substantially the same way, is shown in Figs. 41 to 44 inclusive. As therein and elsewhere shown, the rear end of the machine is provided with upper and lower boards 180 arranged in spaced relation thereto and in covering relation to the openings through which the chains proceed. Inside of the upper board I secure a guide plate 181 (see Fig. 44), that is provided with flanges 182 extending inwardly toward the rear wall 51, these flanges being spaced apart the required distance to enter within the grooves 133 of each carrier. The upper end of this plate is formed with a widened head from the opposite ends of which flanges 183 extend inwardly, their extremities being outwardly turned to provide ears 184 for attachment to the cabinet end. The two flanges extending from the head are sufficiently distant from each other to lie adjacent the outer sides of the two conveyor chains, and extend inwardly far enough to support the plate so that the edges of the two flanges 182 are maintained in the path of travel of the carriers, as best shown in Fig. 43. The effect of this construction is to provide a means which will positively prevent the chains from spreading until after they have passed below the plate flanges 183, and which will positively hold each carrier spindle from endwise movement until it has traveled below the guide plate.

Associated with the means just described, are a pair of chain spreaders which may conveniently be formed, as shown in Fig. 43. The spreader is therein shown to comprise a body having its sides turned in the form of flanges 186 one of which is apertured to facilitate fastening to the end wall of the cabinet. The body of this spreader is upwardly extended at 187 and obliquely inclined to engage the inner side of one chain so as to deflect its movement from a straight downward course to one which is angular thereto. When the device of Fig. 43 is arranged in place adjacent one of the chains in the manner shown in Fig. 41, it will effect a lateral shift of that chain away from the other, so that the effect of two such devices is to spread the chains a distance sufficient to disengage the carrier spindles carried thereby.

The construction just described, while differing from that previously shown in Figs. 20 and 21, operates in substantially the same manner, in that it affords a means of spreading the chains to release the carriers, other means being provided for preventing the carriers from moving endwise during the operation of release. The receiving rack 177 shown in Fig. 1 may, of course, be associated with the take-off mechanism last described which is offered as suggestive of a mechanism that is well suited to the purposes of this invention.

*Observations.*

The general construction and operation of the several parts of the present machine have already been explained, and it remains only to add a few observations with reference to its operation as a whole.

It should be apparent that this apparatus has capacity for continuous operation so as to handle a large number of films adapted to be successively treated. The speed of travel of the conveyer should, of course, be governed with reference to the time required for the developing, washing, fixing, and drying of the films, the time elements for each being variable according to the length of the course that the chains are required to travel in each compartment. As already explained adjustment in the length of such courses may be determined by the height at which the idler sprockets are positioned in each compartment. If desired, a mechanical control for a switch which governs the motor 85 may be arranged, so that when a film is placed upon the conveyer, the operator may set the device to stop operation of the machine when the film has completed its circuit therethrough. Such an apparatus is suggested in Figs. 25 and 26, and may conveniently be formed as follows:

The idler sprockets 158 that project out from the forward end of the cabinet are mounted fast upon a shaft 189 that carries at one end a collar 190 on which is a single tooth 191 arranged to mesh with a pinion 192 so as to advance the same with each revolution a distance of one tooth. The pinion is mounted upon a threaded shaft 193 with which engages an arm 194 pivoted at 195 to any suitable support. A spring 196 is arranged to maintain the arm operatively upon the threaded shaft so as to ensure its travel longitudinally thereof as the pinion 192 is advanced under the action of the revolving tooth 191. The mechanism just described operates to move the shaft 193 very slowly so that if the arm 194 be moved over to an outer position upon the shaft 193, the conveyer chains will be required to carry the film completely through the machine before the arm will have traveled over sufficiently to press in one button 197 of a switch 198 which is arranged operatively thereto. When actuated in this manner, the motor is cut off and operation of the machine is stopped. The control just described is suggestive of one which is suitable for this invention, but obviously may be modified in any desired way.

The preceding description has been concerned with a machine having five liquid compartments and three drying compartments, each of the latter having duplex passages, but I would have it understood that the number of these compartments, as well as the relative sizes of each, may be varied to suit different conditions. Such considerations as capacity, speed of operation, character of films to be handled, etc., will probably determine the proportions and size of the machine. It is particularly to be noted that the present apparatus is designed for the treatment of relatively short length films which may vary considerably as to width, as well as length, so that it is desirable to employ carriers as a connecting medium between the films under treatment and the conveyer which takes them through the various compartments of the machine. According to the construction that I have shown, the conveyer is in the form of a pair of endless chains that are spaced apart a fixed distance so as to receive between them carriers which are capable of handling films whose width may be anything less than the distance between the conveyers. The use of endless chains is suggestive as one form of conveyer, but any equivalent structure, such as belts, cables, or otherwise, might be employed.

Some of the features which have been described in connection with the present apparatus are desirable for use under certain conditions, such, for instance, as the receiving hood, the employment of which would be required where the machine is operated in a light room. It is obvious, of course that this entire part of the structure might be dispensed with in case the apparatus be installed in a dark room. Also, as another example of a part of this machine whose use is not required under all conditions, I would mention the drying apparatus, two suggestive constructions whereof are shown. Manifestly the forced manner of drying heretofore described is advantageous where the air compartments are of relatively short length and the time interval allotted for the drying is relatively short, but under conditions where greater drying space can be provided, or where the time element is of less importance, the arrangement of parts herein shown might be very considerably modified.

In conclusion it is to be emphasized that the principles that are basic to this invention may be embodied into structures varying considerably as to details. The different means that have been suggested herein as appropriate or suitable to the purpose of this invention are such as I have found by experience to be entirely satisfactory. Changes or modifications in many particulars, such, for instance, as have been repeatedly suggested in the foregoing specification, may be adopted without materially affecting the operation that is novel to this machine, and without departing from the principles underlying my invention. Accordingly what I desire to include within the patent is to be determined by reference to the language of the appended claims which are as follows:

I claim:

1. In a film developing machine of the kind described, the combination of a conveyer in the form of a pair of endless chains arranged to travel through the machine a uniform distance apart, elements projected laterally from the chains, carriers adapted to be detachably mounted between a pair of elements, means for securing one end of a film to each carrier, and means arranged exteriorly of the machine for detaching the carriers from the chains, there being a rack associated with said means onto which the carriers and films are deposited, substantially as described.

2. In a machine of the kind described employing an endless conveyer, a film carrier adapted for attachment to the conveyer, and means for removing the carrier from the conveyer at a selected point, said means being associated with a device for guiding the carrier in a straight line movement during the operation of its removal from the conveyer, substantially as described.

3. In a machine of the kind described employing a conveyer having thereon spaced elements, a film carrier in the form of a spindle having its ends adapted for connection with the conveyer elements, means for spreading apart the said elements to thereby disconnect the carrier from the conveyer, and means acting upon the carrier for holding the same against endwise movement as the elements are spread apart, substantially as described.

4. In a machine of the kind described, the combination of a conveyer in the form of a pair of endless chains composed of links every other one of which is provided with an apertured lug, a film carrier in the form of a spindle having its ends adapted to lie within the apertures of a pair of opposite lugs whereby the carrier is disposed transversely between the chains, sprocket wheels around which the chains are passed to direct them through a desired course, certain of the sprockets being formed with teeth having near their outer extremities a shoulder adapted to abut the links intermediately of those carrying the lugs whereby the lugs may lie toward such sprockets but remain out of contact therewith while passing therearound, substantially as described.

5. In a machine of the kind described, the combination with a conveyer having spaced elements projecting therefrom, of a film carrier adapted for attachment to the elements, the carrier having an annular groove near each end, means for disengaging the carrier from the conveyer at a fixed point, and other means associated therewith adapted to engage within the grooves of the carrier to prevent endwise movements thereof during the operation of release, substantially as described.

6. In a developing machine, the combination with a conveyer from which project a plurality of apertured lugs arranged equidistantly apart in pairs, of a film carrier in the form of a spindle having its ends adapted to lie within the apertures of a pair of lugs and to remain secured therein, the spindle being formed with means for securing thereto the end of a film whereby it may travel with the conveyer, substantially as described.

7. In a machine of the class described, the combination with a conveyer having spaced elements projecting therefrom, of a film carrier adapted for attachment thereto, the carrier being in the form of a spindle having its ends shaped to connect rotatably with the elements, and means for securing the end of a film to the carrier including a clamping wire movably arranged with respect to the spindle, the wire ends being adapted to engage with the conveyer to limit the rotary movement of the spindle thereupon, substantially as described.

8. In a machine of the kind described, the combination of a conveyer from which projects a pair of apertured lugs, a film carrier in the form of a spindle having its ends adapted to lie within the lug apertures, means for limiting rotary movement of the spindle within the apertures comprising a wire projecting laterally from the spindle and arranged to extend longitudinally thereof, the wire affording a means around which the end of a film may be looped for attachment to the carrier, substantially as described.

9. In a machine of the kind described, the combination of a conveyer, a film carrier adapted for attachment thereto and comprising a spindle formed with a longitudinal slit through which the end of a film may be looped, and means arranged upon the spindle movable toward and from the slit edge to clamp the film in place, substantially as described.

10. In a machine of the kind described, the combination with a conveyer, of a film carrier adapted for attachment thereto, the carrier being in the form of a spindle having therein a longitudinal slit and a pair of transverse openings aligned with the slit, one to the outside of each end thereof, and a wire extending longitudinally of the spindle having its ends bent to pass through the openings therein and thereafter outwardly again toward the spindle ends, the central portion of the wire lying adjacent one edge of the slit and affording a means around which the film end may be looped when passed through the slit, the wire being slidable towards and from the slit to thereby clamp the film in place, substantially as described.

11. In a machine of the kind described, a film carrier in the form of a spindle slitted longitudinally for the major portion of its length to receive therethrough the looped end of a film, and a wire movably arranged adjacent one edge of the slit and around which the film may be looped, the wire being movable toward and from the slit to thereby clamp the film in place, and means to which the carrier may be secured for travel through a developing machine, substantially as described.

12. A machine of the kind described including in combination an endless conveyer, electrically operated means for driving the conveyer, a shaft rotated with movement of the conveyer, threads formed on the shaft, a member engaged with the threads adapted to be moved longitudinally of the shaft as the same is revolved, and a cut-out switch adapted to be actuated when the arm has reached a predetermined position longitudinally of the shaft whereby the conveyer driving means is stopped, substantially as described.

13. In a film developing machine of the kind described, the combination of a conveyer in the form of a pair of endless chains arranged to travel through the machine a uniform distance apart, carriers adapted to be detachably mounted between the chains, means for securing one end of a film to each carrier, and means arranged exteriorly of the machine for detaching the carriers from the chains, there being a rack associated with said means onto which the carriers and films are deposited, substantially as described.

14. In a machine of the kind described employing a conveyer having thereon spaced elements, a film carrier having its ends adapted for connection with the conveyer elements, means for spreading apart the said elements to thereby disconnect the carrier from the conveyer, and means for holding the carrier against endwise movement as the elements are spread apart, substantially as described.

CHARLES M. BOYCE.

Witness:
EPHRAIM BANNING.